United States Patent [19]
Fall

[11] Patent Number: 5,757,810
[45] Date of Patent: May 26, 1998

[54] TRANSMISSION LINK SUPERVISION IN RADIOCOMMUNICATION SYSTEMS

[75] Inventor: Sven Örjan Patrik Fall, Sollentuna, Sweden

[73] Assignee: Telefonaktiebolaget LM Ericsson, Stockholm, Sweden

[21] Appl. No.: 562,390

[22] Filed: Nov. 24, 1995

[51] Int. Cl.$^6$ .................................................. G06F 11/00
[52] U.S. Cl. ................. 371/5.1; 395/183.19; 395/185.09
[58] Field of Search ........................... 371/5.1, 8.2, 30, 371/31, 35, 37.1, 37.7, 61, 62, 67.1, 5.4, 37.01; 395/183.19, 185.01, 185.02, 185.08, 185.09; 364/265.1, 265.2, 944.5; 370/13, 53, 241, 242; 375/213, 224

[56] References Cited

U.S. PATENT DOCUMENTS

| | | | |
|---|---|---|---|
| 4,831,624 | 5/1989 | McLaughlin et al. | 371/31 |
| 4,872,171 | 10/1989 | Wakumura et al. | 371/40.1 |
| 5,084,891 | 1/1992 | Ariyavisitakul et al. | 371/42 |
| 5,138,616 | 8/1992 | Wagner, Jr. et al. | 371/5.1 |
| 5,430,724 | 7/1995 | Fall et al. | 370/79 |
| 5,434,854 | 7/1995 | Focarile et al. | 370/60.1 |
| 5,436,900 | 7/1995 | Hammar et al. | 370/83 |
| 5,440,759 | 8/1995 | Barnes et al. | 455/15 |
| 5,491,719 | 2/1996 | Sellin et al. | 375/213 |
| 5,515,397 | 5/1996 | Wiorek | 375/224 |
| 5,563,895 | 10/1996 | Malkamaki et al. | 371/32 |

FOREIGN PATENT DOCUMENTS

| | | |
|---|---|---|
| 95/01072 | 1/1995 | WIPO . |
| 95/01682 | 1/1995 | WIPO . |
| 95/13579 | 5/1995 | WIPO . |
| 95/26602 | 10/1995 | WIPO . |

OTHER PUBLICATIONS

European Standard Search Report No. RS 96058 Date of completion of search: 6 Jun. 1996.

*Primary Examiner*—Robert W. Beausoliel, Jr.
*Assistant Examiner*—Trinh L. Tu
*Attorney, Agent, or Firm*—Burns, Doane, Swecker & Mathis, L.L.P.

[57] ABSTRACT

A digital cellular communications system has a bidirectional transmission link for conveying encoded speech and control data in the form of blocks, a switching unit coupled to a first end of the transmission link, and a base station coupled to a second end of the transmission link. The switching unit includes a speech encoder for encoding speech signals, an error detection code generator for generating an error detection code from the encoded speech signal, and a formatter, coupled to the error detection code generator, for producing a formatted block to be transmitted on the transmission link, the formatted block having a header, the encoded speech data, and the error detection code. The base station has a transmission link error detector for signalling the existence of an error in a received block in response to the received block containing an error. Similarly, the switching unit has a transmission link error detector for signalling the existence of an erroneously received block which has been transmitted in the uplink direction. The number of errors is monitored by a transmission link supervisor which reports if the errors indicate that the quality of the transmission link has degraded beyond a predetermined threshold.

29 Claims, 4 Drawing Sheets

TRANSMISSION LINK SUPERVISION IN RADIOCOMMUNICATION SYSTEMS

RELATED APPLICATION AND PATENT

The present application is related to U.S. patent application Ser. No. 08/085,044 entitled "System for Handling Data Errors on a Cellular Communications System PCM Link", which application was filed on Jul. 2, 1993 and which is now U.S. Pat. No. 5,491,709. The disclosure of this related application is expressly incorporated here by reference. The interested reader is also referred to U.S. Patent No. 5,430,724 entitled "TDMA On A Cellular Communications System PCM Link", the disclosure of which is also expressly incorporated here by reference.

BACKGROUND

The present invention relates to radiocommunication systems and more particularly to a method and apparatus for detecting errors in radiotelephone communications switching unit to base station links, and for supervising the quality of links in such systems.

A radiocommunication system, such as the European Global System for Mobile Communication (GSM) mobile telephone system, may include elements as shown in FIG. 1a. A base station transceiver (BST) 103 is connected to a Base Station Controller (BSC) 101 by a Pulse Code Modulation (PCM) link 107. Of course, those skilled in the art will appreciate that other types of transmission links can also be used to connect the BST with the BSC. The base station transceiver 103 includes a speech coder-decoder (codec) 109. In the past, digitized speech signals have been transmitted by the BSC 101 at a rate of 64 kilobits per second (kbps) to the base station transceiver 103 through the PCM link 107. Once inside the base station transceiver 103, a speech codec 109 transforms the digitized speech into blocks of parameters having fewer bits than the original, thus enabling the speech to be transmitted to the mobile station 105 at a lower bit rate than is possible for the original speech samples. The encoded speech signals are converted back into the original speech samples by a speech decoder (not shown) located inside the mobile station 105.

Recently, the design of systems, such as the GSM system, have been modified as shown in FIG. 1b so that the speech codec 109' is located within the BSC 101' instead of in the base station transceiver 103'. The speech codec 109' may process, for example, 160 samples (1280 bits of PCM code) for each 20 msec of speech, and produce therefrom blocks of encoded speech having a lower bit rate than the original speech. This produces the advantage of increasing transmission capacity over the PCM link 107' between the base station transceiver 103' and the BSC 101' when compared with the system of FIG. 1a, for example, by a factor of three for D-AMPS specified systems and by a factor of four for GSM specified systems.

The base station transceiver 103' channel encodes, modulates, and transmits each received block of coded speech to the mobile station 105' via a radio link. In addition to transmitting coded speech to the mobile station 105', the base station transceiver 103' may also transmit control information generated by a control part (not shown) of the base station transceiver 103'. As previously mentioned, the mobile station 105' also contains a decoder (not shown) for reconstructing the original speech from the received blocks of coded speech.

Transmission of speech from the mobile station 105' to the BSC 101' works in a similar way. The mobile station 105' generates and transmits modulated, channel encoded blocks of coded speech to the base station transceiver 103'. The base station transceiver 103' performs demodulation and channel decoding on the received blocks, and forwards the coded speech to the BSC 101' via the PCM link 107'. Should the base station transceiver 103' determine that it has received control information rather than encoded speech from the mobile station 105', then this control information is routed to the control part of the base station transceiver 103'.

One characteristic of the system as described above is the introduction of errors into the encoded speech blocks due to their transmission over the PCM link 107'. When the speech codec is located in the base station transceiver 103 instead of the BSC 101', there is little need for error handling on a PCM link because the quality of the received speech is not seriously degraded by the presence of such introduced errors. However, with the speech codec 109' located in the BSC 101', the speech on the PCM link 107' is compressed into fewer bits. As a result, any errors introduced during transmission on the PCM link 107' seriously affect the quality of the speech after it is decoded.

However, prior systems transmitted encoded speech parameters without any mechanism for detecting errors introduced by the PCM link 107'. For example, the base station transceiver 103' can detect, by means of poor received signal quality, the occurrence of errors in speech received from the mobile station 105'. Because the speech received by the base station transceiver 103' from the mobile station 105' is encoded, the detected errors can seriously degrade the quality of the received speech. Consequently, a single bit, called the Bad Frame Indicator (BFI) is sent by the base station transceiver 103' to the BSC 101' along with the block of speech which has been decoded by the base station transceiver 103'. When the BSC 101' detects the BFI being set (indicating the presence of errors introduced on the radio channel between the mobile station 105' and the base station transceiver 103'), it discards the received block of speech and instead passes information from the previously received blocks to the public telephone system. The rationale for doing this is that the previously received speech blocks are likely to closely resemble what the present speech block should look like, so that speech quality will be maintained.

However, systems which include the BFI bit are incapable of detecting errors that are introduced by transmission of speech on the PCM link 107'. As mentioned earlier, this was not critical when the speech codec 109 was located in the base station transceiver 103, since errors introduced into unencoded speech did not seriously degrade the quality of that speech. However, with the codec 109' located in the BSC 101', the detection and subsequent handling of errors introduced by transmission on the PCM link 107' is now quite important. Exemplary techniques for detecting and handling these types of errors are disclosed in the above-incorporated U.S. Patent Application. However, an additional concern resides in preventing such errors before they occur.

The Applicant has recognized that although PCM links typically have very low bit error rates there are periods of time when the bit error rate (BER) is much higher. Those high BER periods occur when, for example, a PCM link is switched between different connections. For example, connections between a BSC and a BS may be rerouted: (1) to use the most cost effective connection, (2) to avoid a node in the transmission chain between the BSC and the BS which has become faulty or (3) to allow maintenance to be performed on a transmission node in the chain. These types of switching activities can cause a BER of, for example, 50%.

Since these activities are required in many systems, they cannot be easily avoided. Another potential cause of high BERs is that a portion of the transmission chain between the BSC and BS loses its clock reference and has to be resynchronized. To further complicate data transmission, sometimes PCM links become faulty, at which time the duration of the high BER periods increases. Various types of faults are generically referred to herein as "link faults". These include, for example, transmission cables which have been cut, a microwave antenna losing its directional orientation relative to the other end of the link, faulty link interfaces at either the BSC or BS, or link repeaters becoming faulty.

Existing functions for supervising transmission links were based upon unencoded speech being transmitted over the links. These conventional supervisory functions required a BER on a link to exceed about 0.1% for a number of seconds before a link was identified as faulty. While this may be acceptable for conventional systems transferring uncoded speech over the link between the BSC (or MSC) and BS, systems which transfer blocks of encoded speech will suffer from reduced speech quality when the BER is above 0.001% for more than 40 milliseconds.

Simply extending the conventional supervisory function by reducing the BER threshold and reducing the time interval after which a link is considered faulty will not, however, solve the supervisory problem for transmission links carrying encoded blocks of speech. This is so because such an extension would indicate that most links are continuously faulty due to the above-described PCM link behavior. On the other hand, continuing to use the conventional supervisory functions is also unacceptable since this will not secure the speech quality for the connection using the link.

In order to reduce the use of links which provide poor speech quality, it is desirable to identify PCM links which are experiencing faults so that the network can take appropriate remedial action, e.g., not using faulty PCM links in setting up new connections.

SUMMARY

These and other drawbacks and limitations of conventional methods and techniques for conveying data over transmission links in radiocommunication systems are overcome by supervisory techniques and systems according to the present invention. According to exemplary embodiments of the present invention, the error rates of data blocks transferred over transmission links can be monitored by a supervisory function which determines when the quality of a transmission link has deteriorated to a point at which the transmission link should be designated as having insufficient quality. The supervisory function will periodically report the status of each transmission link in a system to the network. Depending upon the status of the transmission link, i.e., as active or inactive, and the type of system involved, the reported information can be used in a variety of ways. For example, if the transmission link quality deteriorates below a predetermined threshold, then an active call could be disconnected. Another way of using this information is to avoid using transmission links which have been designated as having insufficient signal quality when considering which transmission link to use during call setup.

According to exemplary embodiments of the present invention, the errors detected in blocks of data transmitted over the transmission links can be filtered to distinguish between normal periods of high BER and abnormally long high BER periods. For example, the number of blocks having errors which are received over a transmission link can be monitored in one second intervals. For each interval, it can be determined whether or not the number of blocks containing errors exceeds a threshold, for example, two blocks. If the threshold is exceeded, then that interval is marked as "bad". As a second step in the filtering process, the previous five intervals can be reviewed. If, for example, more than two of the previous five intervals have been marked as "bad", then the supervisory function can report to the network that the transmission link is considered to have insufficient quality.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

The following detailed description illustrates the transmission of data between an MSC and a base station in an exemplary radiocommunication system. In this detailed description, the data link between the MSC and the base station is a PCM link, i.e., a link on which the data is pulse code modulated, which is physically embodied as a cable. However, those skilled in the art will recognize that the present invention is readily applicable to other types of data links and/or modulation schemes, for example, ATM connections, data networks, microwave links, etc. Thus, the following description which employs PCM links as an example should not be taken to limit the present invention, which relates to the supervision of transmission links generally, to PCM links specifically.

Figure 1A:
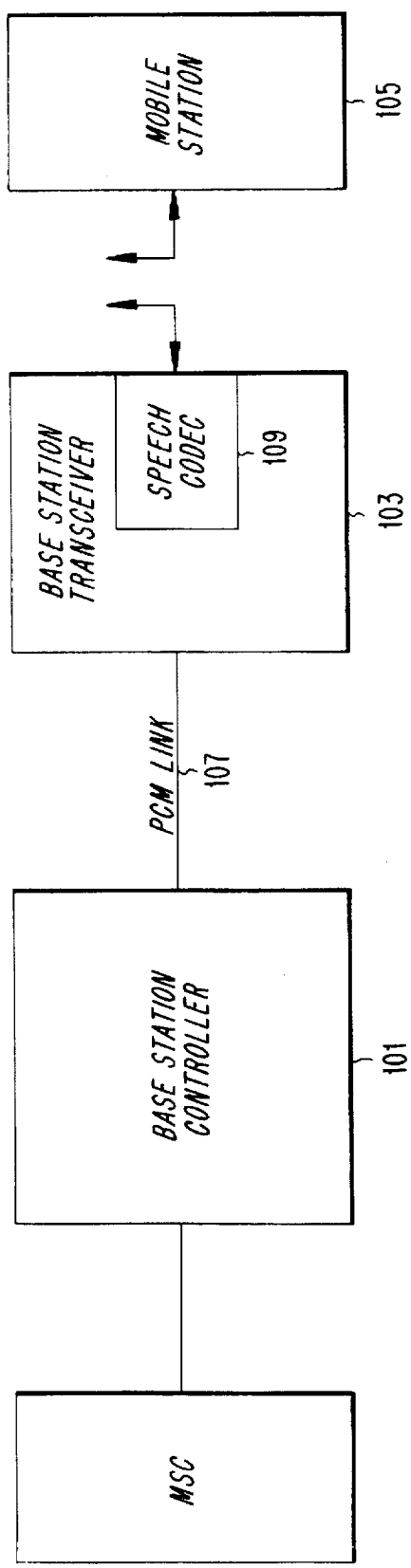
FIGS. 1a and 1b are block diagrams of radiocommunication systems including a transmission link between the base station controller and the base station transceiver, and having a speech codec located, respectively, in the base station transceiver and the base station controller.
Figure 1B:
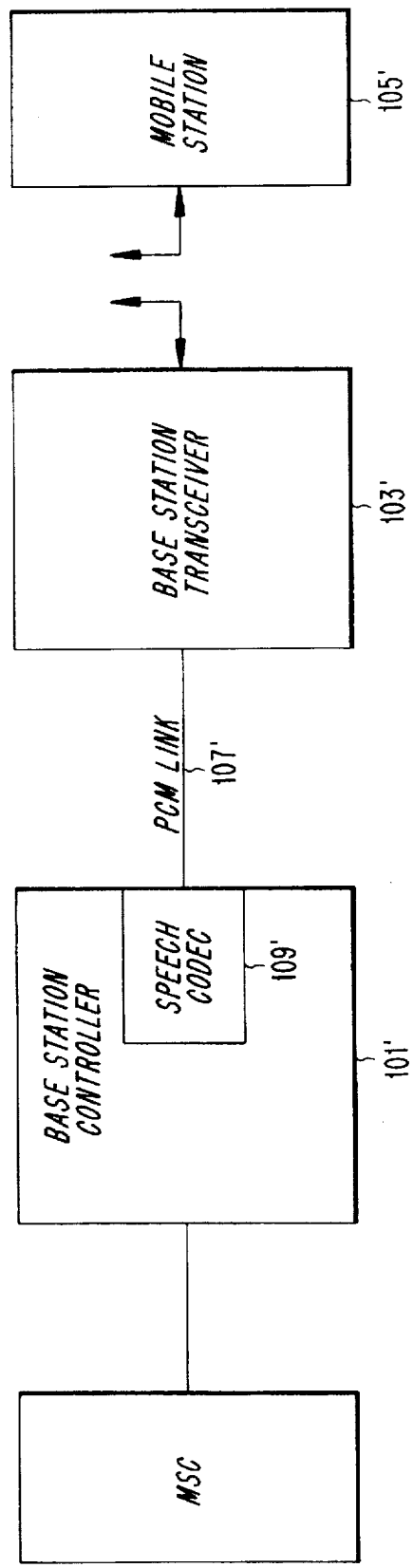
Figure 2:
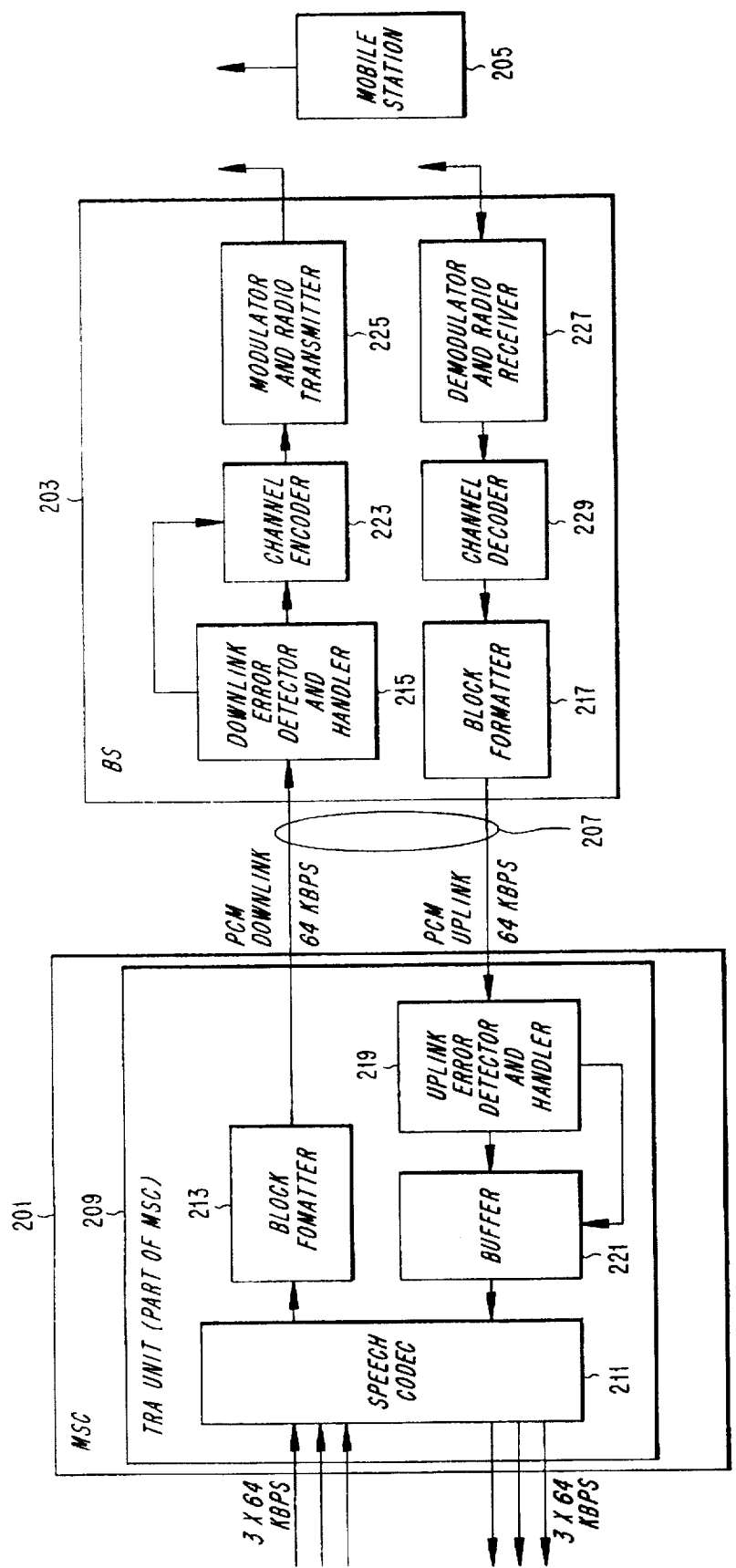
FIG. 2 is a block diagram of an exemplary radiocommunication system in accordance with the present invention.
Figure 3:
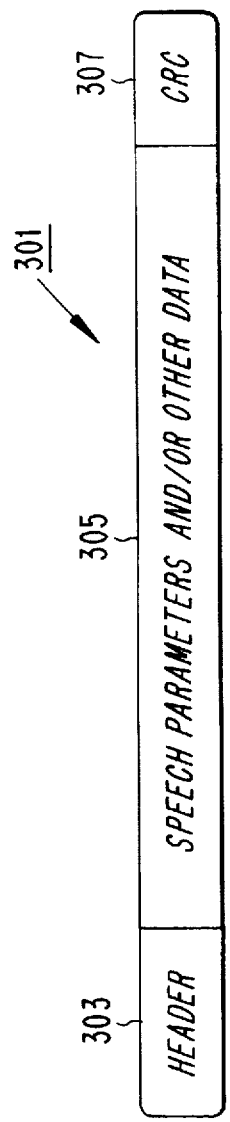
FIG. 3 is a block diagram of a block of encoded speech formatted for transmission on a PCM link, in accordance with an exemplary embodiment of the present invention.
Figure 4:
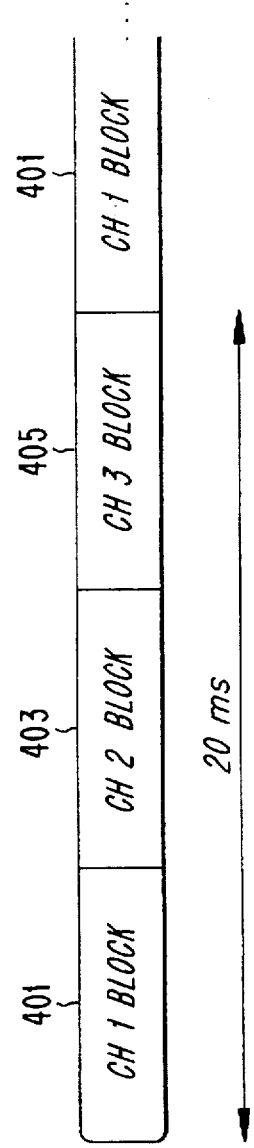
FIG. 4 is a block diagram showing an exemplary time division multiplexing of blocks of encoded speech data on a PCM link.

An exemplary system for detecting bit errors in blocks of encoded speech that are transmitted between an MSC 201 and a base station 203 by way of a PCM link 207 will now be described with reference to FIGS. 2 and 3. Before being transmitted on the PCM link 207, each block of encoded speech is formatted, either by the base station block formatter 217 or the MSC block formatter 213, into block format 301. Block format 301 may have a variable size which is preferably less than or equal to 53 bytes. This upper limit makes it possible to multiplex three channels into one 64 kilobit/second (kb/sec) PCM channel, because 64 kb/sec implies 160 samples per 20 msec. Consequently, each of three channels would be allocated 160/3=53 bytes per channel. In this exemplary embodiment, each PCM link 207 operates at 64 kilobits per second (kbps), and supports three speech channels in a full rate mode by transmitting time multiplexed blocks as shown in FIG. 4. Each of the time multiplexed blocks 401, 403, 405 can be formatted in accordance with block format 301.

The block format 301 has three positionally defined fields. The encoded speech or other data is located in the middle field 305, and for the purposes of this invention, need not be reformatted in any way during the formatting process. At the beginning of the block format 301 is a header field 303. The header field 303 includes a synchronization sequence which identifies it as the start of a new block. The header field 303 also includes length information which specifies how many more bytes there are in the block, and receiver address fields which are used for routing the middle field 305 (containing encoded speech and/or other data) to the proper destination.

The last part of the block format 301 is an error detection code field 307. In this exemplary embodiment, the error detection code is a Cyclic Redundancy Check (CRC) code. The CRC computation for the block format 301 may be performed by the MSC block formatter 213. By including an error detection code field 307 in each block, the base station downlink error detector and handler 215 can make advantageous use of well known error detection techniques to identify blocks, i.e., by computing a checksum for each block, which have had errors introduced by their transmission over the PCM link 207. The channel encoder 223 uses coding techniques, e.g., those specified by the IS-54B standard, to add error correction and detection data to the bits transferred from the downlink error detector and handler 215 that are to be transmitted over the radio channel. The encoded data stream is then modulated and transmitted over the air interface to mobile station 205 using conventional circuitry as denoted by block 225.

The same block format 301 may be used to detect errors introduced when the base station 203 uplinks encoded speech or other data to the MSC 201. In this case, the base station block formatter 217 formats the demodulated, channel decoded data received from mobile station 205 and processed in demodulator and radio receiver 227 and channel decoder 229 into the block format 301 by adding the header field 303 and the error detection code field 307. After transmission via the PCM link 207, the MSC uplink error detector and handler 219 can then identify blocks which have had errors introduced during the transmission. Buffer 221 is used to store blocks of encoded speech that are output from MSC uplink error detector and handler 219 for decoding by speech codec 211.

Once errors have been detected in either the uplink or downlink, these errors can be corrected in a variety of ways. A detailed description of techniques for correcting errors received in blocks of coded data received over the PCM link is beyond the scope of the present discussion. However, interested readers are directed to the above-identified and incorporated by reference patent application, as well as U.S. patent application Ser. No. 08/162,605 entitled "Soft Error Correction in a TDMA Radio System" which was filed on Dec. 7, 1993 and which is also incorporated here by reference. For the purposes of the present invention, where error handling can be provided in combination with link supervision, it suffices to mention an exemplary error handling technique wherein an erroneously received block is discarded and replaced with speech data associated with a previously received block.

Figure 5:
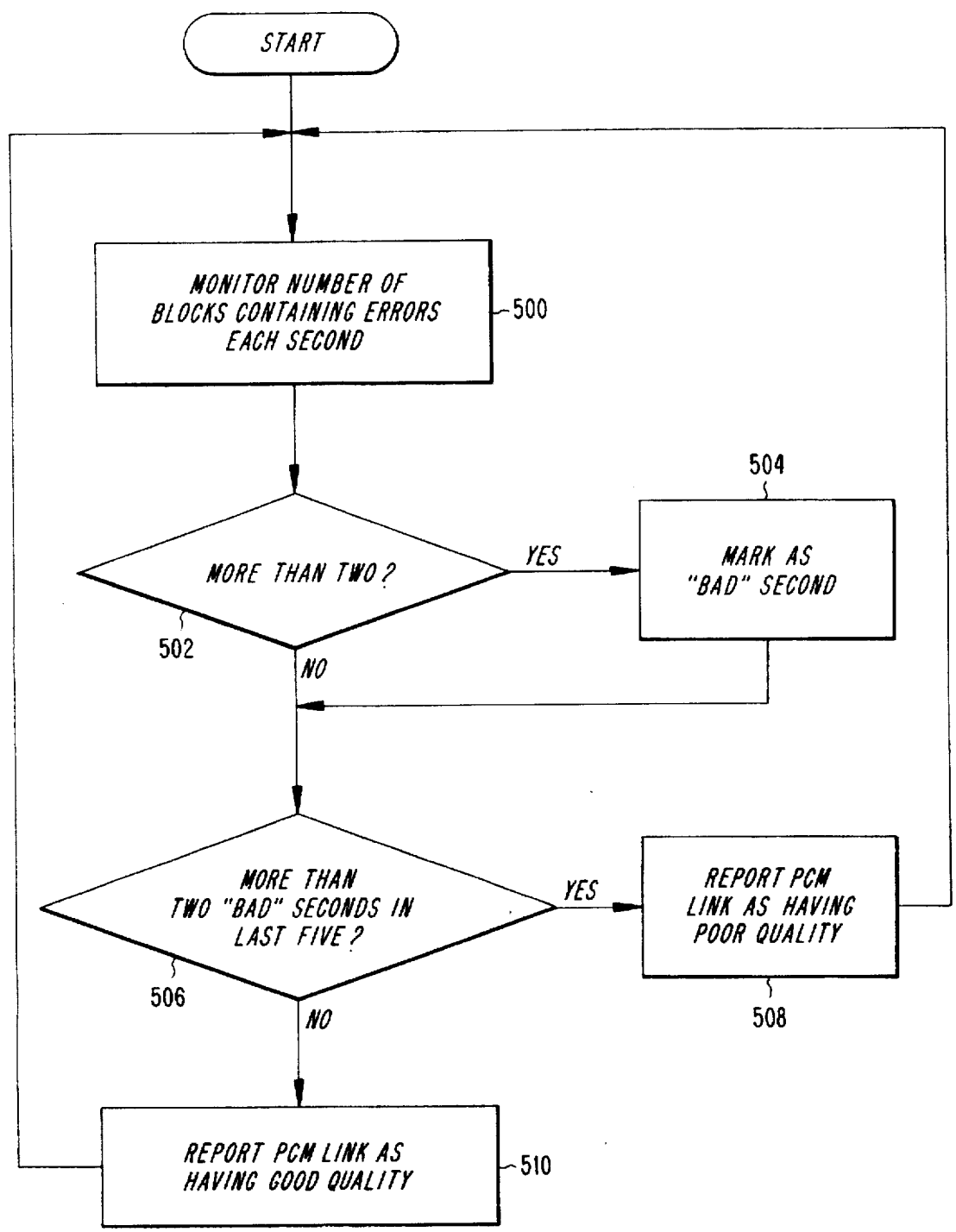
FIG. 5 is a flowchart illustrating transmission link supervision according to an exemplary embodiment of the present invention.

In addition to correcting errors which are detected to improve the quality of speech reproduced, systems and methods according to the present invention also use the detection of errors to monitor the quality of the PCM links to prevent additional errors from being generated by reusing faulty links. An exemplary embodiment of a transmission link supervisor will now be described with reference to FIG. 5.

Therein, at step 500, the number of blocks having at least one error, sometimes referred to herein as an "erroneously received block", are monitored over a predetermined time interval. This function can, for example, be implemented in either or both of the MSC 201 and the BS 203 in error detector and handler blocks 219 and 215, respectively (or BSC 101 in a GSM specified system). According to this exemplary embodiment of the present invention, the base station reports the number of blocks identified at step 500 (using part of data field 305, for example) to the MSC 201. The MSC 201 then performs the supervisory functions set forth in steps 502–510 with respect to both the blocks reported by the base station which were detected on the downlink and the blocks identified by the MSC which were detected on the uplink. Of course those skilled in the art will appreciate that supervisory functions according to the present invention can be performed at any desired node in the transmission chain to most efficiently use data processing resources.

A first threshold is set in the supervisor for the number of erroneously received blocks which can be tolerated during a predetermined time interval, e.g., a number of bad blocks which will not degrade speech quality beyond a desirable level. For the purposes of the exemplary embodiment of FIG. 5, a one second time interval has been selected as the monitoring interval. However, those skilled in the art will recognize that any monitoring interval can be used and that the first threshold can be set accordingly. In the PCM link example described above, wherein speech is transmitted in blocks of 20 millisecond duration (i.e., 50 blocks per second), Applicant has determined that a desirable threshold above which speech quality is seriously impacted by errors introduced on the PCM link is two erroneously received blocks per second.

Accordingly, at step 502, the PCM link supervisor checks to see if more than two blocks have been received in the last second which contain errors. If so, then the flow proceeds along the "yes" branch to step 504 wherein the supervisor marks that second as bad. The supervisor then stores the quality indication, i.e., bad or not bad, and reviews a previous history of time intervals at step 506.

As mentioned in the background, certain high BER periods are inherent in communication systems involving switching. Thus, it is not typically sufficient to simply report the transmission link as having poor quality for each instance that a bad second is observed by the supervisor. Instead, according to exemplary embodiments of the present invention, the recent history of monitoring intervals (e.g., seconds) is filtered to determine if the transmission link is indeed faulty or is simply suffering from a normal high BER period.

For example, Applicant has noted that the switching of PCM links which creates the aforedescribed high bit error rate conditions should only endure for at most two seconds. Accordingly, if more than two of, for example, the last five seconds have been marked as bad at step 506, then the supervisor identifies the associated PCM link as having poor quality at step 508. Surpassing this 40% filtering test indicates that the transmission link is faulty due to, for example, one of the above-described fault conditions. Otherwise, the supervisor identifies the associated PCM link as having good quality at step 510. The determined link quality indication is then reported to the network. Since supervision is constant during activity on a PCM link, the flow then loops back to step 502 to begin with the monitoring of the next interval of received data blocks.

The network can use this information regarding the quality of PCM links in a variety of ways. For example, if a call is ongoing and a PCM link providing data for that connection is identified as having poor quality, then the network could decide to disconnect that call. Another usage for this information is during call setup. When the network (e.g., the MSC in a D-AMPS specified system and the BSC in a GSM specified system) receives a call origination request, it determines which transmitter module and associated PCM link to use for handling that connection. Although the exemplary embodiment of FIG. 2 shows only one set of equipment, i.e., one base station transceiver and PCM link pair, those skilled in the art will appreciate that each base station has many transceivers and, therefore, at least several PCM links connected thereto from the network. Accordingly, during call setup, the network can review a current status of PCM link quality for each PCM link associated with a particular base station and select one of the PCM links which has not been identified as having poor quality to handle the new connection.

The above-described exemplary embodiments are intended to be illustrative in all respects, rather than restrictive, of the present invention. Thus the present invention is capable of many variations in detailed implementation that can be derived from the description contained herein by a person skilled in the art. For example, the frequency of bad intervals which is used to identify a transmission link as faulty will naturally vary based upon the type of transmission link being monitored. Thus while a 40% frequency (2 out of 5 recent seconds) has been determined to identify faulty PCM links, other types of transmission links will likely exhibit other types of faulty behavior, which behavior can then be used to filter the raw error detection data available to the MSC, BSC or base station. All such variations and modifications are considered to be within the scope and spirit of the present invention as defined by the following claims.

What I claim is:

1. A digital cellular communications system comprising:
   a switching unit including a speech code for coding downlink speech signals and decoding uplink speech signals that are respectively transmitted to and received from a base station via a transmission link;
   wherein the transmission link conveys encoded downlink and uplink speech and control data in the form of respective downlink and uplink blocks;
   wherein the base station operates to relay an encoded downlink speech signal received from the switching unit to a mobile station by transmission on a radio channel and to relay to the switching unit an encoded uplink speech signal received from the mobile station by transmission on the transmission link; and
   means for marking a monitoring interval if a predetermined number of one of downlink and uplink blocks is conveyed erroneously over said transmission link during said monitoring interval and for reporting said transmission link as having poor quality if a predetermined number of monitoring intervals are marked within a predetermined time period.

2. The system of claim 1, wherein said means for marking and determining is disposed in said switching unit.

3. The system of claim 1, wherein said means for marking and determining evaluates said transmission link based on blocks which are received on said downlink.

4. The system of claim 1, wherein said means for marking and determining evaluates said transmission link based on blocks which are received on said uplink.

5. The system of claim 1, wherein said transmission link is a PCM link.

6. The system of claim 1, further comprising:
   in the switching unit, link transmission means including:
      means for generating an error detection code from the encoded downlink speech signal; and
      formatting means, coupled to the generating means, for producing a formatted downlink block to be transmitted on the transmission link, the formatted downlink block having a header, the encoded downlink speech signal, and the error detection code; and
   in the base station, link error detecting means for signalling existence of an error in a received downlink block in response to the received downlink block containing an error to said means for marking and determining, wherein said means for marking and determining includes a counter for counting a number of blocks having errors in each said monitoring interval.

7. The system of claim 6, wherein the error detection code is a cyclic redundancy check code.

8. The system of claim 1, further comprising:
   in the base station, link transmission means including:
      means for generating an error detection code from the encoded uplink speech signal; and
      formatting means, coupled to the generating means, for producing a formatted uplink block to be transmitted on the transmission link, the formatted uplink block having a header, the encoded uplink speech signal, and the error detection code; and
   in the switching unit, link error detecting means for signalling existence of an error in a received uplink block in response to the received uplink block containing an error to said means for marking and determining, wherein said means for marking and determining includes a counter for counting a number of blocks having errors in each said monitoring interval.

9. The system of claim 8, wherein the error detection code is a cyclic redundancy check code.

10. The system of claim 1, wherein said predetermined number of blocks is two, said monitoring interval is one second, said predetermined number of monitoring intervals is two, and said time period is five seconds.

11. The system of claim 1, further comprising:
   in the switching unit, an apparatus comprising:
      input means for receiving a signal indicative of existence of an error in a received uplink block; and
      uplink error handling means, coupled to the input means, for discarding a received uplink block in response to the signal indicating existence of an error therein, and for substituting therefor a substitute block including encoded speech data stored from a previously received uplink block, wherein said means for marking and determining includes a counter for counting a number of said signals received by said input means in each said monitoring interval.

12. A digital cellular communications system comprising:
   a bidirectional transmission link for conveying encoded speech and control data in a block format;
   a switching unit coupled to a first end of the transmission link, the switching unit including:
      a speech encoder for encoding speech signals;
      means for generating an error detection code from the encoded speech signal; and formatting means, coupled to the generating means, for producing a formatted downlink block to be transmitted on the transmission link, the formatted downlink block having a header, the encoded speech data, and the error detection code;

a base station coupled to a second end of the transmission link, the base station including link error detecting means for signalling existence of an error in a received downlink block in response to the received downlink block containing an error;

first means for receiving said signalled error existence from said base station and generating an error signal if a first rate of erroneously received downlink blocks exceeds a first threshold; and second means for filtering an output of said first means by comparing a second rate at which said error signals are generated to a second threshold to distinguish between faulty and normal behavior of said transmission link.

13. The system of claim 12, wherein the error detection code is a cyclic redundancy check code.

14. The system of claim 12, wherein the transmission link is a PCM link.

15. The system of claim 12, wherein said first threshold is two blocks per second.

16. The system of claim 12, wherein said second threshold is two out of five most recent time intervals.

17. The system of claim 12, wherein the base station further comprises:

means for generating an error detection code from an encoded speech signal received from a mobile station; and formatting means, coupled to the generating means, for producing a formatted uplink block to be transmitted on the transmission link, the formatted uplink block having a header, the encoded speech signal, and the error detection code, and wherein the switching unit further comprises:

said first means monitoring a number of erroneously received uplink blocks over a predetermined time interval; and link error detecting means for signalling, to said first means, existence of an error in a received uplink block in response to the received uplink block containing an error.

18. The system of claim 17, wherein said first means generates said error signal if a rate of erroneously received uplink blocks exceeds said first threshold.

19. The system of claim 17, further comprising:

in the switching unit, an apparatus comprising:

input means for receiving a signal indicative of existence of an error in a received uplink block; and uplink error handling means, coupled to the input means, for discarding a received uplink block in response to the signal indicating existence of an error therein, and for substituting therefor a substitute block including encoded speech data stored from a previously received uplink block.

20. The system of claim 12, wherein said first and second means are disposed in said switching unit.

21. A method for supervising a data transmission link comprising the steps of:

counting a number of erroneously received blocks of data which have been transmitted through said data transmission link over a predetermined period of time;

determining if said number exceeds a first threshold;

selectively categorizing said period of time as a bad time period based upon said determination;

storing said categorization of said period of time;

evaluating a plurality of recent categorizations to determine if a number of bad time periods exceeds a second threshold; and selectively reporting that said data transmission link has insufficient quality based upon a result of said step of evaluating.

22. The method of claim 21, wherein said data transmission link is a PCM link.

23. The method of claim 21, wherein said first threshold is two blocks.

24. The method of claim 21, wherein said second threshold is two bad time periods within a last five time periods.

25. The method of claim 21, further comprising the step of:

correcting said erroneously received blocks of data.

26. A method for handling a connection between a switching unit and a base station using one of a plurality of transmission links comprising the steps of:

monitoring, for each of said plurality of transmission links, a number of erroneously received blocks over a predetermined time interval;

selectively marking time intervals based upon a result of said monitoring step;

distinguishing between faulty and normal behavior of each of said plurality of transmission links based upon a time distribution of said marked time intervals;

selecting as said one of said plurality of data transmission links, a transmission link which has not been identified as faulty for handling said connection; and setting up said connection between said switching unit and said base station using said selected one of said data transmission links.

27. The method of claim 26, wherein said data transmission links are PCM links.

28. The method of claim 26, further comprising the steps of:

continuing, after said step of setting up said connection, to monitor said number of erroneously received blocks of said selected one of said data transmission links; and if said selected one of said data transmission links becomes faulty, taking remedial action.

29. The method of claim 28, wherein said step of taking remedial action further comprises the step of:

disconnecting the connection.

* * * * *